(12) United States Patent
Zarubinsky et al.

(10) Patent No.: US 8,526,756 B2
(45) Date of Patent: Sep. 3, 2013

(54) METHOD AND SYSTEM ARRANGED FOR FILTERING AN IMAGE

(75) Inventors: Michael Zarubinsky, Rishon Lezion (IL); Shlomo Beer-Gingold, Guivat Shmuel (IL); Michelle Kosashvili, Holon (IL)

(73) Assignee: Freescale Semiconductor, Inc., Austin, TX (US)

( * ) Notice: Subject to any disclaimer, the term of this patent is extended or adjusted under 35 U.S.C. 154(b) by 38 days.

(21) Appl. No.: 13/258,759

(22) PCT Filed: Apr. 9, 2009

(86) PCT No.: PCT/IB2009/051508
§ 371 (c)(1),
(2), (4) Date: Sep. 22, 2011

(87) PCT Pub. No.: WO2010/116202
PCT Pub. Date: Oct. 14, 2010

(65) Prior Publication Data
US 2012/0020560 A1 Jan. 26, 2012

(51) Int. Cl.
*G06K 9/40* (2006.01)
*G06K 9/34* (2006.01)
(52) U.S. Cl.
USPC .......................................... 382/261; 382/173
(58) Field of Classification Search
USPC ................. 382/260–264, 173; 348/610, 609
See application file for complete search history.

(56) References Cited

U.S. PATENT DOCUMENTS

| | | | |
|---|---|---|---|
| 6,346,970 B1 | 2/2002 | Boehlke | |
| 6,970,207 B1 * | 11/2005 | Seigneret et al. | 348/607 |
| 7,119,815 B1 * | 10/2006 | Cahill, III | 345/629 |
| 7,394,856 B2 | 7/2008 | Bhaskaran | |
| 7,551,226 B2 * | 6/2009 | Kondo et al. | 348/441 |
| 2002/0113899 A1 | 8/2002 | Swan | |
| 2003/0081855 A1 | 5/2003 | Dolazza | |
| 2005/0063605 A1 | 3/2005 | Huang et al. | |
| 2008/0285873 A1 | 11/2008 | Ando et al. | |

OTHER PUBLICATIONS

International Search Report and Written Opinion correlating to PCT/IB2009/051508 dated Jan. 11, 2010.

* cited by examiner

*Primary Examiner* — Yon Couso

(57) ABSTRACT

A method and a system, the system includes: a memory unit, an image region definer, a spectral analyzer, a determination module, and an image processor. The spectral analyzer is arranged to divide a frequency spectrum of each image region into at least three image region frequency range components (IRFRCs); and calculate an energy level for each IRFRC. The comparator configured to compare the energy level of each IRFRC to at least one frequency region threshold to provide a comparison result for each IRFRC; wherein each frequency region threshold is calculated based on an intensity parameter of an image section and based on an energy parameter of at least one reference image section; a determination module arranged to determine a processing operation for each IRFRC, based on a comparison result associated with the IRFRC and based on a configurable decision rule.

20 Claims, 8 Drawing Sheets

200 (cont.)

US 8,526,756 B2

METHOD AND SYSTEM ARRANGED FOR FILTERING AN IMAGE

FIELD OF THE INVENTION

The field of this invention relates to a system and a method for filtering an image/video using multiple filters.

BACKGROUND OF THE INVENTION

Modern consumer multimedia devices (such as portable media players, personal navigation devices, mobile internet device etc) typically have the capability to provide (high quality) video output, e.g. at a display of the device. However, limitations of camera sensors, video compression, transmission of the video through communication channels adversely affect the video quality due to unwanted effects.

Flickering is an example of such an unwanted effect. It can occur in television systems and the like that use an interlaced scan line technique in order to minimize the signal bandwidth used. With the interlaced scan line technique, an image is displayed as two scan line fields; one scan line field comprising the odd horizontal lines of the image; and the second scan line field comprising the even horizontal lines of the image. In this manner, odd and even scan line fields of images are alternately displayed, for example at a rate of 60 fields per second for NTSC (National Television System Committee) systems and at a rate of 50 fields per second for PAL (Phase Alternating Line) systems. The alternating of the display of odd and even lines can result in flickering of the image. Flickering can be seen as an aliasing phenomenon, and is the effect caused when high frequency image energy aliases to low frequency image energy, thereby resulting in low frequency flicker where high spatial vertical frequencies are present.

Other unwanted effects can include noise, contrast degradation blur, ringing and the like.

SUMMARY OF THE INVENTION

The present invention provides a system for filtering image data and method therefor as described in the accompanying claims.

Specific examples of the invention are set forth in the dependent claims.

These and other aspects of the invention will be apparent from, and elucidated with reference to, the examples described hereinafter.

BRIEF DESCRIPTION OF THE DRAWINGS

Further details, aspects and examples of the invention will be described, by way of example only, with reference to the drawings. Elements in the figures are illustrated for simplicity and clarity and have not necessarily been drawn to scale.

DETAILED DESCRIPTION

Figure 1:
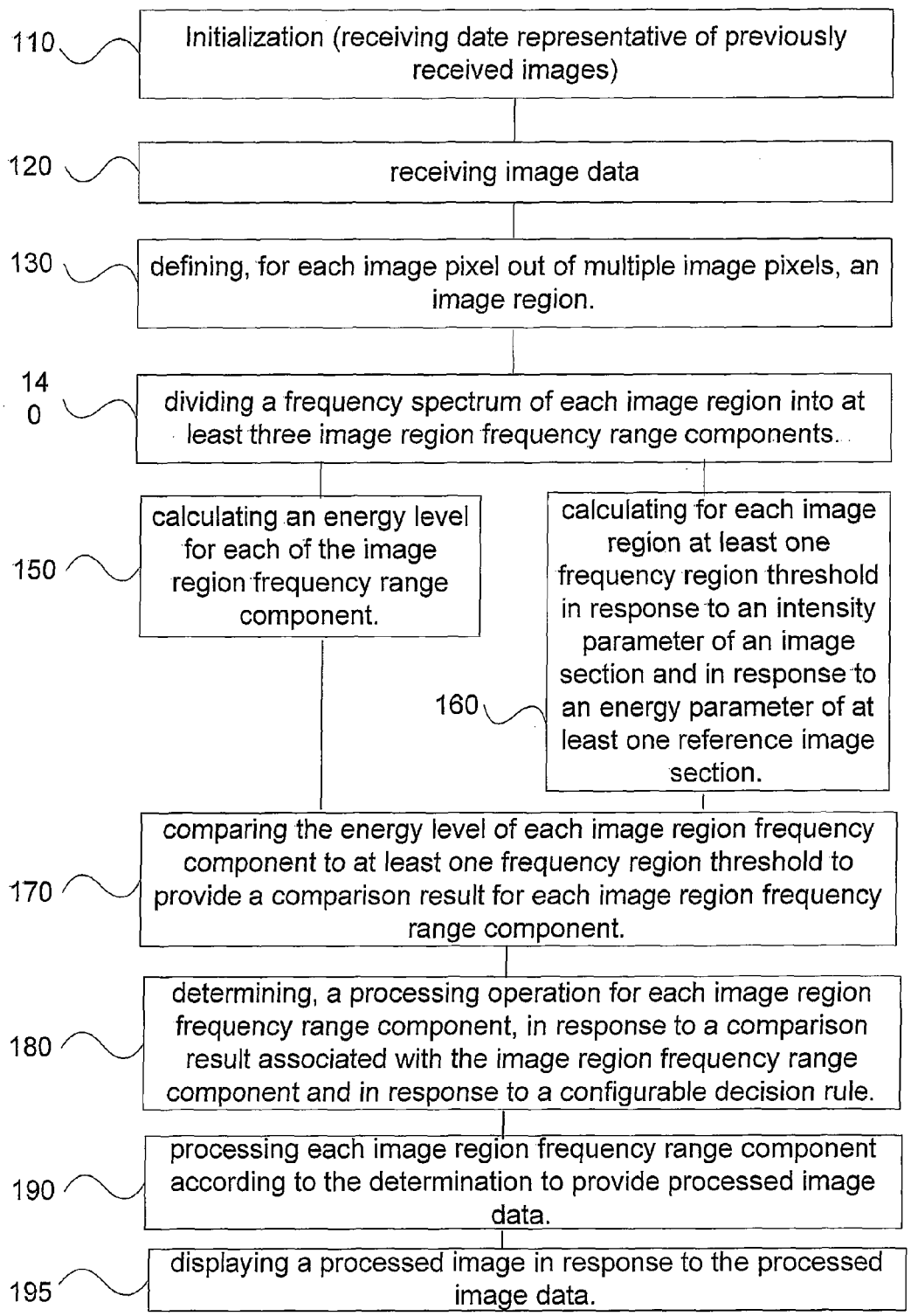
FIG. 1 illustrates an example of an embodiment of a method for filtering image data to be displayed.

FIG. 1 illustrates an example of an embodiment of a method 100 for filtering image data to be displayed.

Method 100 starts by initialization stage 110. Initialization stage 110 can include receiving date representative of previously received images.

Stage 110 is followed by stage 120 of receiving image data. The image data represents an image. The image may include a plurality of pixels, e.g. arranged in multiple rows and columns. An image can include any suitable number of pixels, such as from a few thousand up to millions of pixels.

The image data can include one or more components such as a Red component of the image, a Green component of an image, a blue component of an image. Yet for another example the image data can include a Luma component of the image, two Chroma components of an image and the like.

Figure 2:
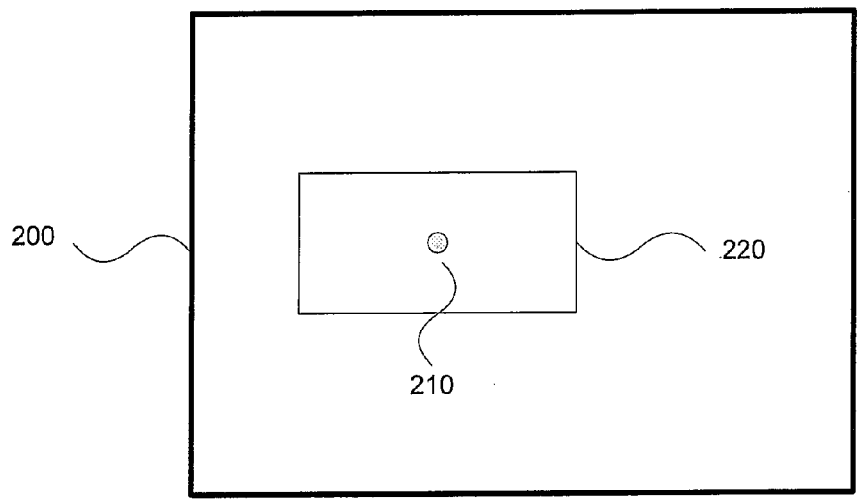
FIG. 2 illustrates an image, a pixel and an image region.

Stage 120 is followed by stage 130 of defining, for each image pixel out of multiple image pixels, an image region. Accordingly, an image region can be defined for each image pixels or only for selected image pixels. FIG. 2 illustrates image 200, pixel 210 and image region 220. Pixel 210 is located in the image region 220 associated with the pixel, in this example the pixel 210 is situated the middle of image region 220. The image region can be of the same size for all pixels of the image but this is not necessarily so. An image region can be rectangular but can also have other shapes. For example an image region of N×M where M equals N or differs from M can be used. If N=M=5 then each image region includes 25 pixels—and the pixel that is being filtered can be located at the middle of the image region. Each pixel of image 200 has its own image region associated therewith.

Image regions can be defined per each pixel of the image or per each pixel out of some (but not all) pixels of the image. For example, if an image includes video portions as well as graphics portions that can be overlaid over the video portion or located in a separate portion of the image that the graphics can be ignored off. This can reduce possible distortions introduced from taking into account graphic bearing pixels. Yet for another example, pixels that define the edge of the image can be ignored of.

Figure 3:
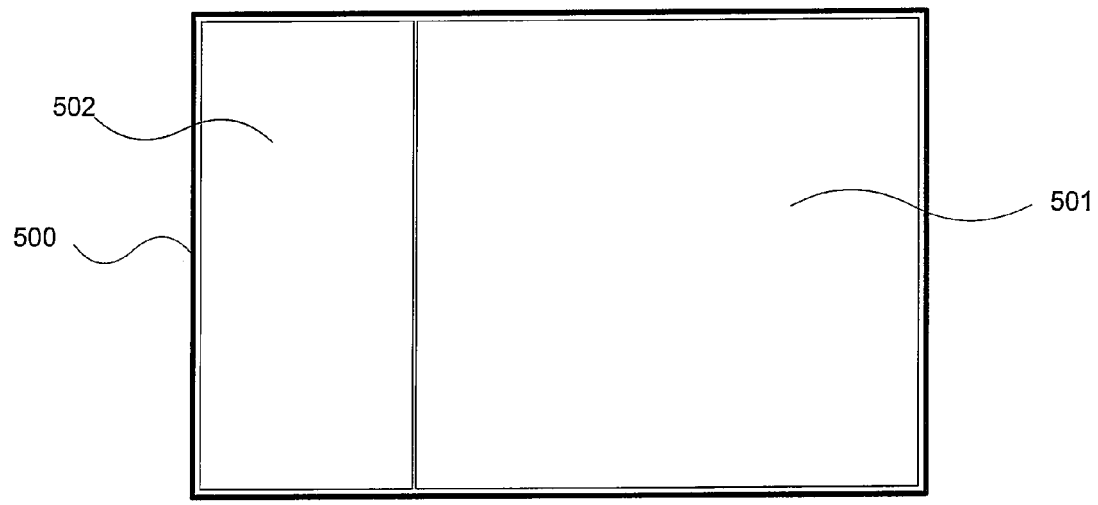
FIG. 3 illustrates an image that has a video portion and a graphic portion.

FIG. 3 illustrates an image 500 that has a video portion 501 and a graphic portion 502. These portions can overlap—as graphics can be overlaid over a video image—but this is not necessarily so. Method 100 can ignore all or some pixels of graphic portion 502. It is noted that an image can include multiple video portions and, additionally or alternatively, multiple graphic portions.

Referring back to FIG. 1, stage 130 is followed by a sequence of stages that are repeated for each defined image region. The sequence can include performing vertical processing and then horizontal processing or vice versa. It is noted that the sequence can include only vertical processing or only horizontal processing.

This sequence starts by stage 140 of dividing a frequency spectrum of each image region into multiple, e.g. at least two or at least three, image region frequency range components.

Figure 4:
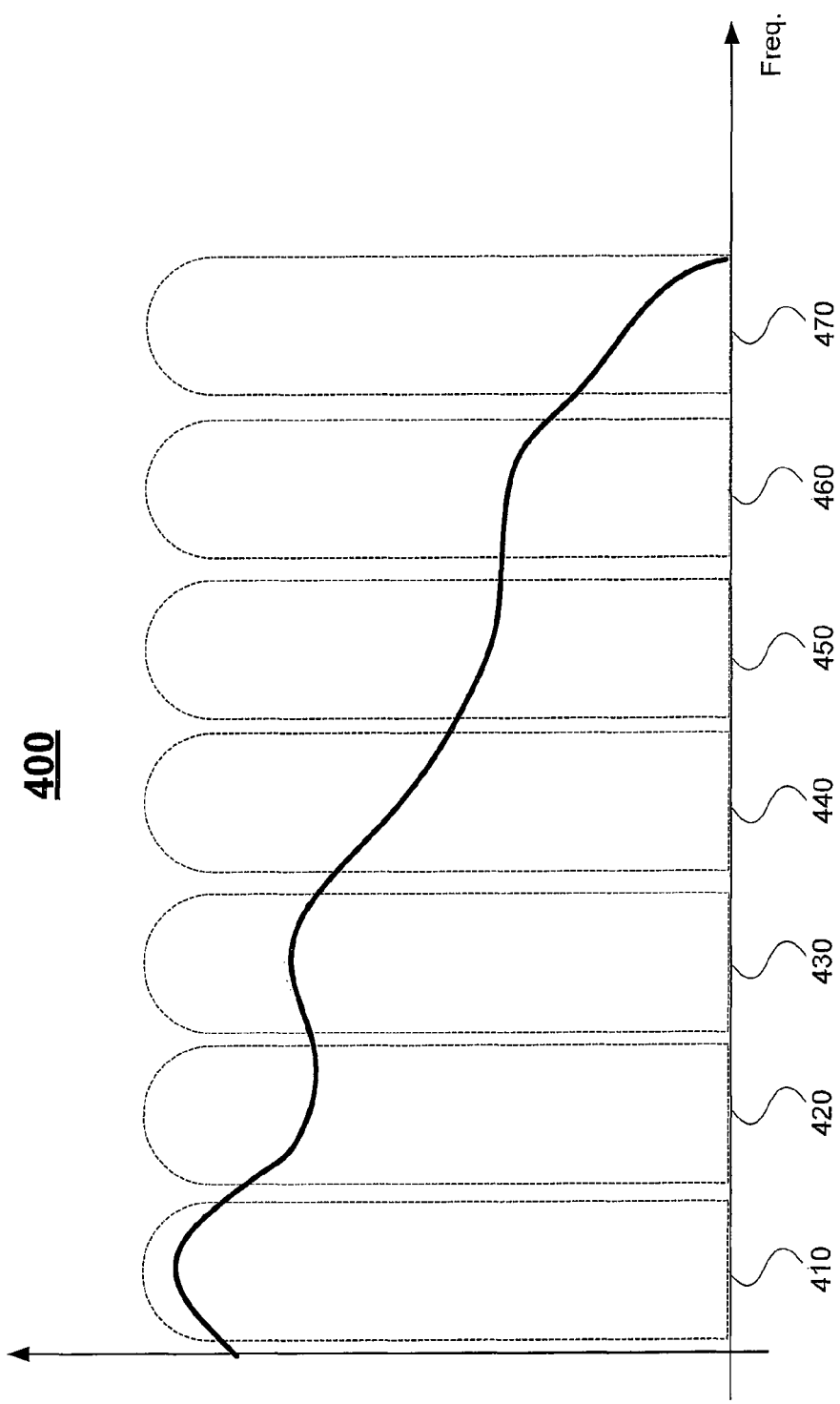
FIG. 4 illustrates an example of an embodiment of a spectrum of an image region and a division of the frequency spectrum to seven non-overlapping frequency bands of even bandwidth.

FIG. 4 illustrates spectrum 400 of an image region and a division of the frequency spectrum to seven non-overlapping frequency bands of even bandwidth denoted 410, 420, 430, 440, 450, 460 and 470. Spectrum 400 can be a vertical spectrum or a horizontal spectrum but this is not necessarily so.

The number of frequency ranges can be increased in order to provide a more accurate and a more controllable process but on the other hand can increase the complexity or time required for the processing of the image data. Accordingly, the number of image region frequency ranges can be provided as a trade off between complexity and controllability of the image processing. The frequency ranges can be of the same bandwidth but can differ from each other by their bandwidth.

The frequency ranges can include horizontal frequency ranges, vertical frequency ranges or a combination thereof. The number and width of the horizontal frequency ranges can equal those of corresponding vertical frequency ranges but this is not necessarily so.

Stage 140 is followed by stages 150 and 160. Each of the following stages is applied on multiple different image region frequency range components either is parallel, in a serial manner or in a combination thereof. Stage 160 can for example follow stage 150 or be performed in parallel.

Stage 150 includes calculating an energy level for each of the image region frequency range component. The calculating of an energy level of an image region frequency can involve filtering image information by a filter to obtain multiple filtered results. The filtered results are complex—they include an imaginary part and a real part. The energy level can be calculated or estimated by: (i) calculating an energy indication associated with a single filtered result, and (ii) processing (for example—averaging) the energy indication obtained from multiple energy indications. The calculating of the energy indication can include calculating an absolute value of a sum of the real and imaginary part or by summing the square of the real part and the square of the imaginary part. Yet for another embodiment of the invention the filtering operation can be replaced by performing a time domain to frequency domain conversion (such as a Discrete Fourier Transform). The calculation of the energy level can be performed per the entire image of per portion of the image.

Stage 160 includes calculating for each image region at least one frequency region threshold based on an intensity parameter of an image section and based on an energy parameter of at least one reference image section associated with the image region. The thresholds can for example be proportional to the energy parameter of the reference image section, as is explained below in more detail.

The intensity parameter may be any measure for the intensity of the image section and can be provided by processing (for example statistically processing) the intensities of pixels of the image section. The intensity parameter can for example be the average intensity of these pixels, a weighted average of these pixels, and the like. The intensity can be represented by gray levels of Luma pixels, or by gray levels of Red, Green and Blue pixels. The intensity parameter can be adapted taking in account the Human visual sense (HVS)

The image section can be the image region itself, multiple image regions, the entire image, and the like. For example, the image section can be image region 220 of FIG. 2, image 200 of FIG. 2, image 500 of FIG. 3, video portion 501 of FIG. 3, an image region of image 500, an image region of video portion 501 of FIG. 3, and the like.

The at least one reference image section can belong to preceding, e.g. previous images, previous to the image that is currently being processed or to both previous images and the current image. Previous images can for example be images that belong to the same video stream as the currently processed image but have older presentation time stamps. The reference section can for instance be a single image region of image (such as an image region of a previous image situated at a corresponding same location in the previous image as the image region of the current image), multiple image regions of an image, multiple image regions of multiple image, entire images, and the like.

The energy parameter can be any suitable measure for the energy of the reference image section. For example, the energy parameter can be the average energy of the reference image section, a weighted average of the energy of the reference image section and the like. The energy parameter is calculated per image region frequency range. It is noted that the calculation of the energy parameter of a high image region frequency range can include performing a first derivative of the reference image section so as to isolate the high frequency components of the reference image section.

As mentioned, Stage 160 of method 100 (FIG. 1) can include calculating, for an image region frequency range component a single or multiple frequency region thresholds. The frequency region thresholds can for instance form multiple sets of thresholds and stage 160 can include selecting between the sets of thresholds, e.g. based on the intensity parameter of the image section.

Figure 5:
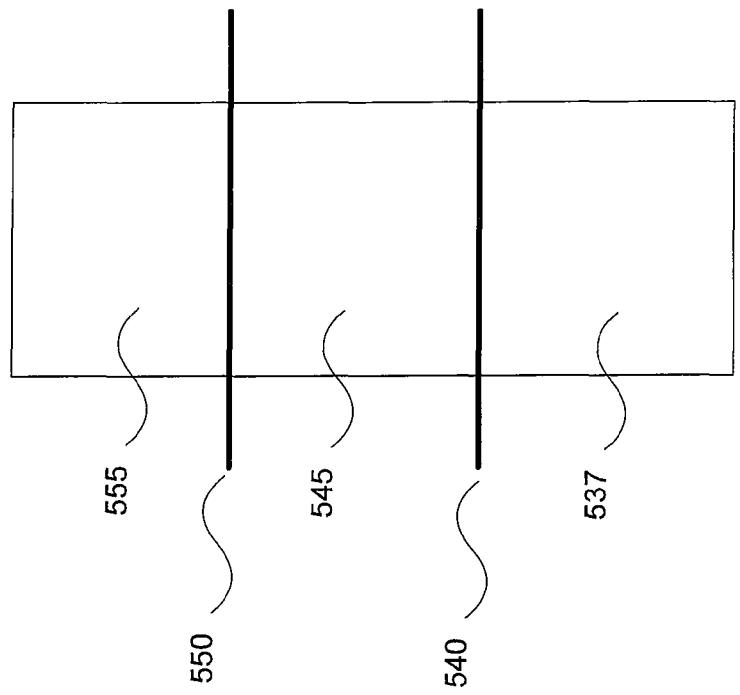
FIG. 5 illustrates multiple frequency region thresholds of two frequency regions.
Figure 5:
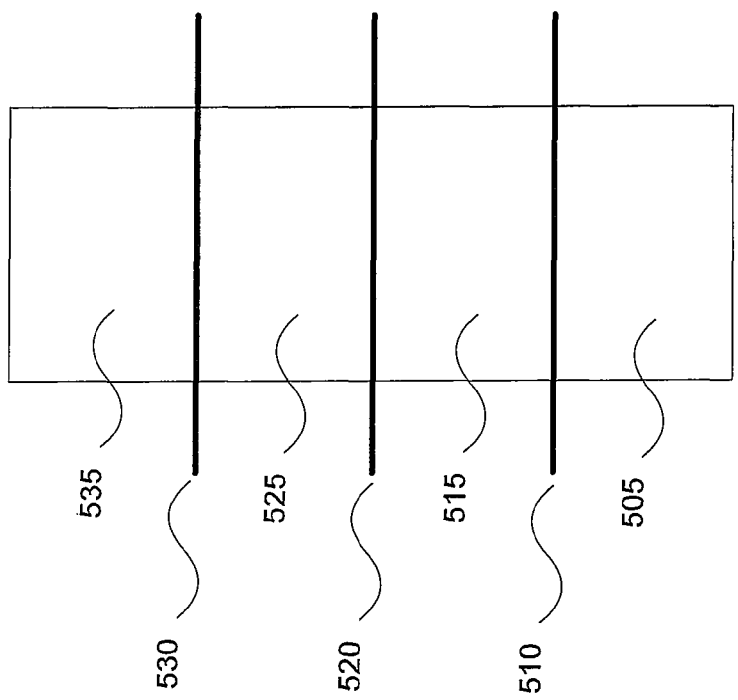

FIG. 5 illustrates three frequency region thresholds 510, 520 and 530 of a first frequency bands. These thresholds define four respective intensity parameter ranges 505, 515, 525 and 535 an intensity parameter range below frequency region threshold 510, an intensity parameter range between frequency region thresholds 510 and 520, an intensity parameter range between frequency region thresholds 520 and 530, and an intensity parameter range above frequency region threshold 530.

FIG. 5 also illustrates two frequency region thresholds 540 and 550 of a second frequency band. These thresholds define three intensity parameter ranges 537, 545 and 555—an intensity parameter range below frequency region threshold 540, an intensity parameter range between frequency region thresholds 540 and 550, and an intensity parameter range above frequency region threshold 550.

Figure 6:
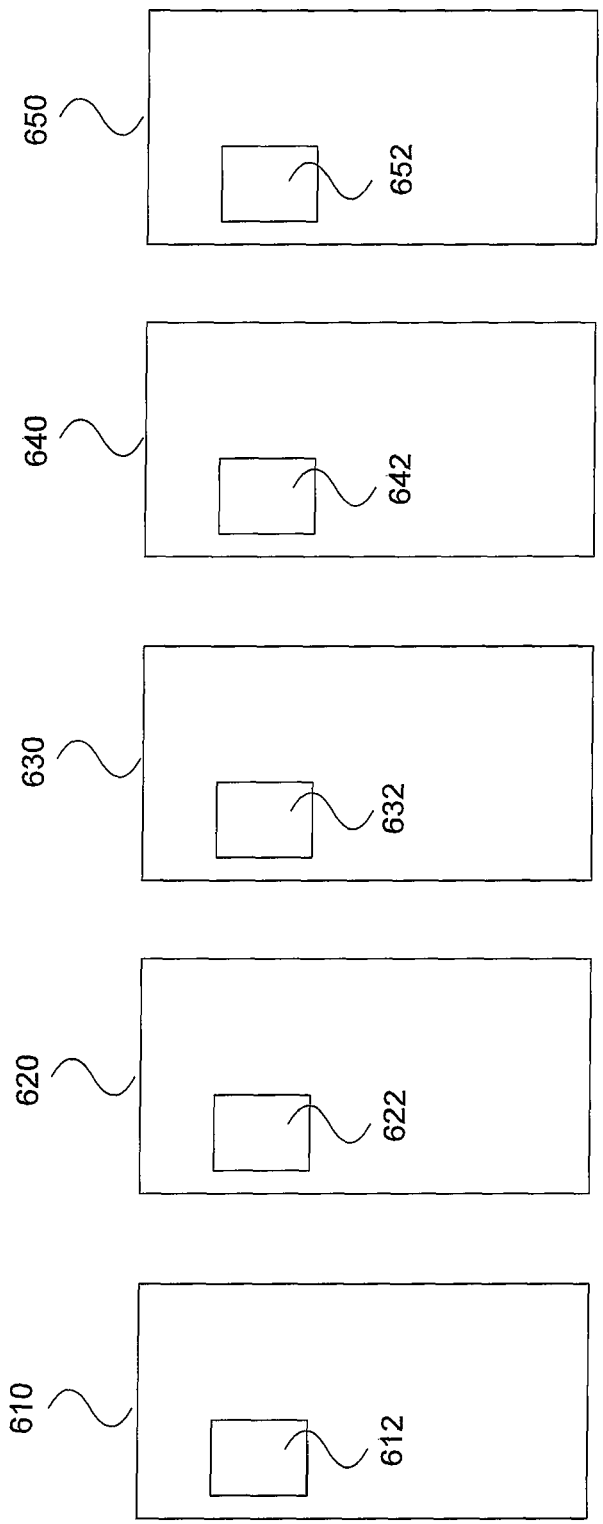
FIG. 6 illustrates a sequence of images.

FIG. 6 illustrates a sequence of images 610, 620, 630, 640 and 650. These images may for example be displayed one after the other, and form part of a video sequence. In this example, image 650 is the currently processed image while images 610, 620, 630 and 640 can be referred to as previous images.

Each image includes multiple image regions such as image regions 612, 622, 632, 642 and 652. These image regions belong to different images but are located at a corresponding position in the images.

When image region 612 is being evaluated, the reference image section can be any image region out of image regions 622, 632, 642 and 652, can be image region 612 itself, can be any image of images 610, 620, 630, 640 and 650. For example, the image regions 612, 622, 632, 642 of the previous images may be reference image sections and the energy parameter can be obtained by determining the energy parameter of each reference image section applying a function (such as a statistical function) on the energy parameters to obtain a single energy parameter.

For example, frequency region thresholds (TH1 . . . TH6) can be defined for a certain image region frequency range component of an image region. These frequency region thresholds may for example be calculated by multiplying the energy parameter (EP) of the image region by suitable coefficients K1 . . . K6, e.g. in case of six frequency region thresholds, six coefficients may have been predetermined: $TH1=K1*EP$, $TH2=K2*EP$, $TH3=K3*EP$, $TH4=K4*EP$, $TH5=K5*EP$, and $TH6=K6*EP$. These frequency region thresholds can be arranged in two sets—one includes TH1, TH2 and TH3 and the other set includes TH4, TH5 and TH6. The selection of a set out of these two sets is based on the value of the intensity parameter (IP), and for example a first set may be selected when IP is below a certain threshold and a second set may be selected when IP is above a certain threshold.

Table 1 provides an example of two sets of three frequency range thresholds each (high, middle and low), wherein K1=0.4, K2=0.9, K3=2, K4=0.2, K5=0.4 and K6=1.

TABLE 1

| thresholds | Selection rule | |
|---|---|---|
| | IP > 128 | IP < 128 |
| High | 2.0 * EP | 1.0 * EP |
| Middle | 0.9 * EP | 0.4 * EP |
| Low | 0.4 * EP | 0.2 * EP |

In this example the number of thresholds is the same for the different image region frequency ranges. However, it will be apparent that different image region frequency ranges can have a different number of frequency range thresholds. Also, in this example the different image region frequency ranges are assumed to have the same coefficients K, however different image region frequency ranges can be associated with the same coefficients or with different coefficients.

Stages 150 and 160 of method 100 are followed by stage 170 of comparing the energy level of each image region frequency range component to at least one frequency region threshold to provide a comparison result for each image region frequency range component. The comparing may for example determine in which intensity parameter range the energy level falls.

Stage 170 is followed by stage 180 of determining, a suitable processing operation for each image region frequency range component, based on the comparison result (obtained in stage 170) associated with the image region frequency range component and based on a configurable decision rule. The processing operation can for example be a filtering operation or a bypass operation. A bypass operation does not alter the image region frequency range component—and the pixel associated with the image region remains unchanged by the bypass operation.

The configurable decision rule can assign a processing operation for each intensity parameter range. For example—referring to the example set fourth in FIG. 5—a low pass filtering (for noise reduction) can be applied for intensity parameter range 505, a bypass operation can be applied for intensity parameter range 515, a high-pass filtering operation can be applied for intensity parameter range 525, a de-ringing filtering operation can be applied for intensity parameter range 535, a low pass filtering (for noise reduction) can be applied for intensity parameter range 537, a bypass operation can be applied for intensity parameter range 545, and a deflicker filtering operation can be applied for intensity parameter range 555.

The processing operation may also include e.g. deflicker filtering to an image region, e.g. for a high frequency range component. Stage 180 is followed by stage 190 of performing on each image region frequency range component the processing operation determined in stage 180, in order to obtain processed image data.

The processing of the different image frequency range components can provide multiple intermediate results. These intermediate results can be processed to provide a processed pixel value. The processing can include applying statistical functions, a sum operation, a weighted sum operation and the like. The processing can be applied on the entire intermediate results or on a sub-set of the intermediate results. For example, intermediate results associated with vertical frequency range components can be processed to provide a vertical intermediate result, intermediate results associated with horizontal frequency range components can be processed to provide a horizontal intermediate result. If, for example, vertical processing is applied before horizontal processing then the outcome of the vertical processing is processed image data that then undergoes horizontal processing.

Stage 190 is followed by stage 195 of displaying a processed image based on the processed image data. Stage 190 can for example be followed by storing the processed image or processed image data in a memory unit. The processed image data can then be sent to a display and cause the display to display a processed image in a for humans perceptible form.

Figure 7:
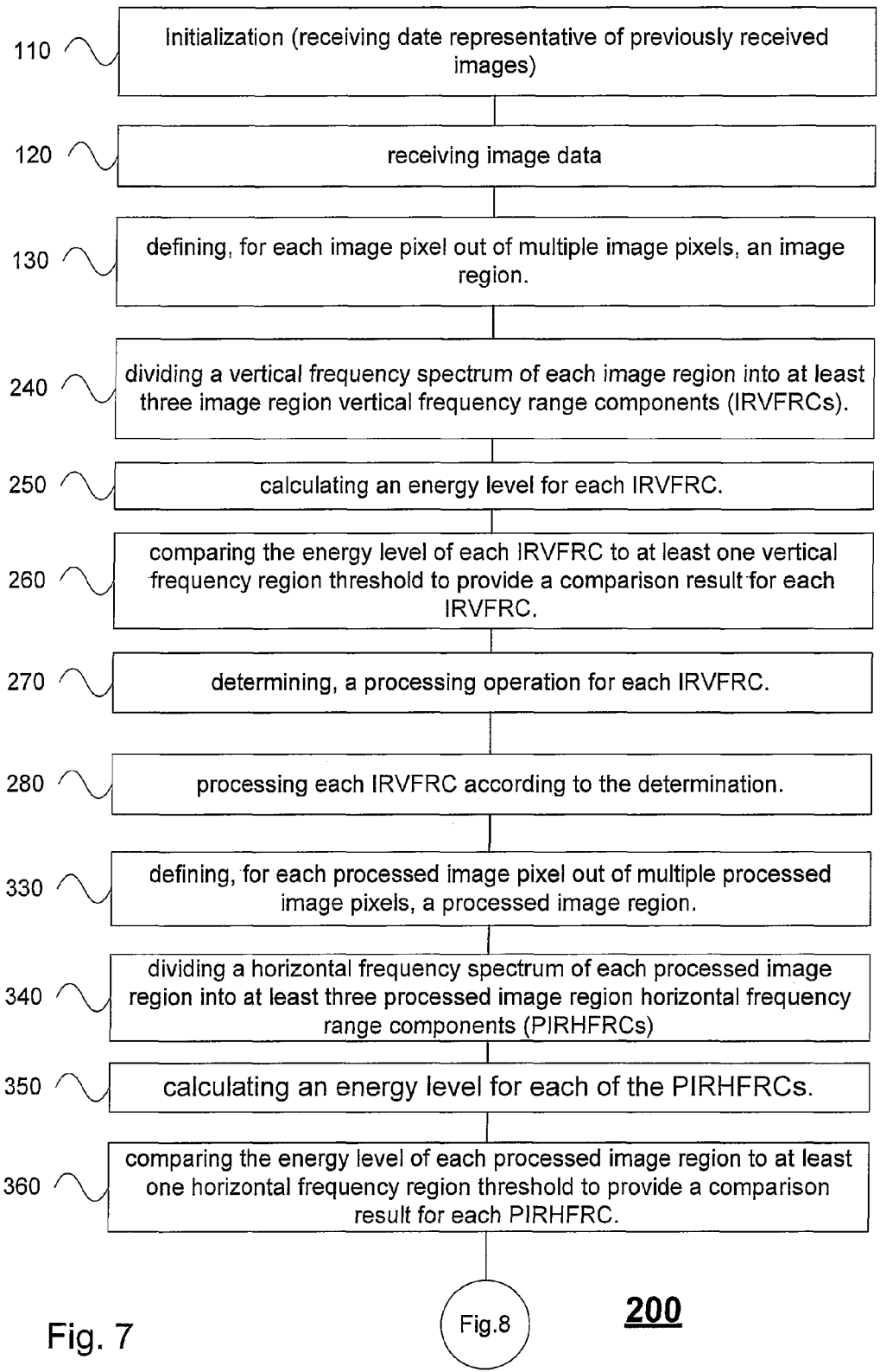
FIG. 7 and FIG. 8 illustrate an example of an embodiment of a method for filtering image data to be displayed.
Figure 8:
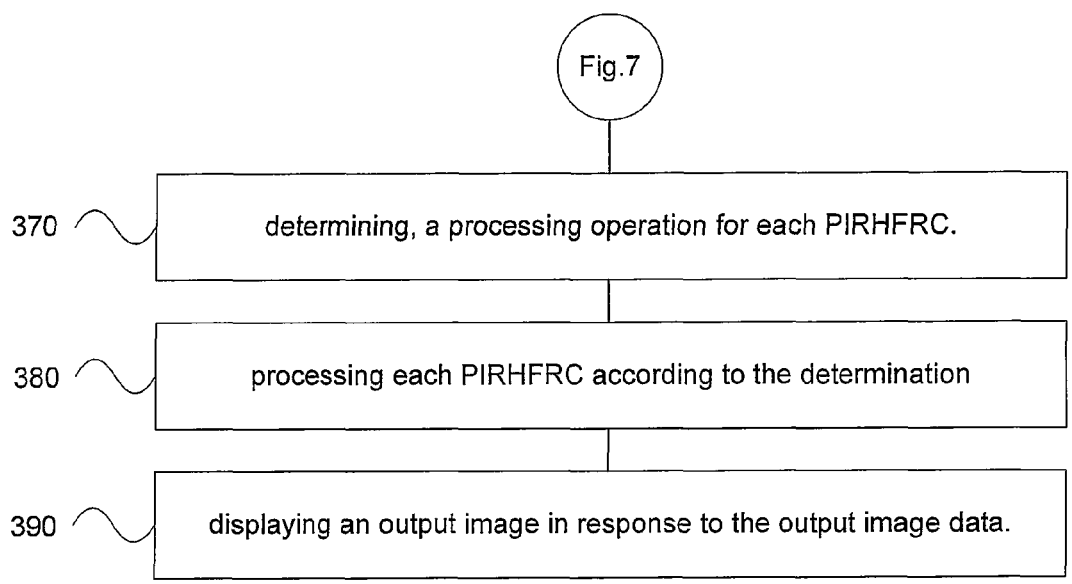

FIG. 7 and FIG. 8 illustrate another example of an embodiment of method 200 for filtering image data to be displayed, illustrating vertical processing followed by horizontal processing.

Method 200 starts with stages 110-130 which may be similar to those of the method illustrated in FIG. 1, and for sake of brevity are not described again. In the example of FIGS. 7 and 8, stage 130 is followed by stage 240 of dividing a vertical frequency spectrum of each image region into multiple, e.g. at least three, image region vertical frequency range components (IRVFRCs).

Stage 240 is followed by stage 250 of calculating an energy level for each IRVFRC.

Stage 250 is followed by stage 260 of comparing the energy level of each IRVFRC to at least one vertical frequency region threshold to provide a comparison result for each IRVFRC.

Stage 260 is followed by stage 270 of determining, based on the comparison result, a suitable processing operation for each IRVFRC.

Stage 270 is followed by stage 280 of processing each IRVFRC according to the determined processing operation. The outcome of stage 280 is the processed image data.

Stage 280 can include, for example, applying a function on intermediate results associated with vertical frequency range components. The processed image data can include pixels that are unchanged (if a bypass operation was selected) or changed (if one or more processing operations were applied in relation to that pixel).

Stage 280 is followed by stage 330 of defining, for each processed image pixel out of multiple processed image pixels, a processed image region. Typically the processed image regions are located at the same location as corresponding image regions.

Stage 330 is followed by stage 340 of dividing a horizontal frequency spectrum of each processed image region into at least three processed image region horizontal frequency range components (PIRHFRCs).

Stage 340 is followed by stage 350 of calculating an energy level for each of the PIRHFRCs.

Stage 350 is followed by stage 360 of comparing the energy level of each processed image region to at least one horizontal frequency region threshold to provide a comparison result for each PIRHFRC.

Stage 360 is followed by stage 370 of determining, based on the comparison result, a suitable processing operation for each PIRHFRC.

Stage 370 is followed by stage 380 of processing each PIRHFRC according to the determination. The outcome of stage 380 is also referred to as an output image data.

Stage 380 can include, for example, applying a function on intermediate results associated with horizontal frequency range components. The processed image data can include pixels that are unchanged (if a bypass operation was selected) or changed (if one or more processing operations were applied in relation to that pixel).

Stage 380 is followed by stage 390 of displaying an output image based on the output image data. Stage 390 may for example include storing the output image or output image data in a memory unit. The output image data can then be sent to a display and cause the display to display a output image.

Figure 9:
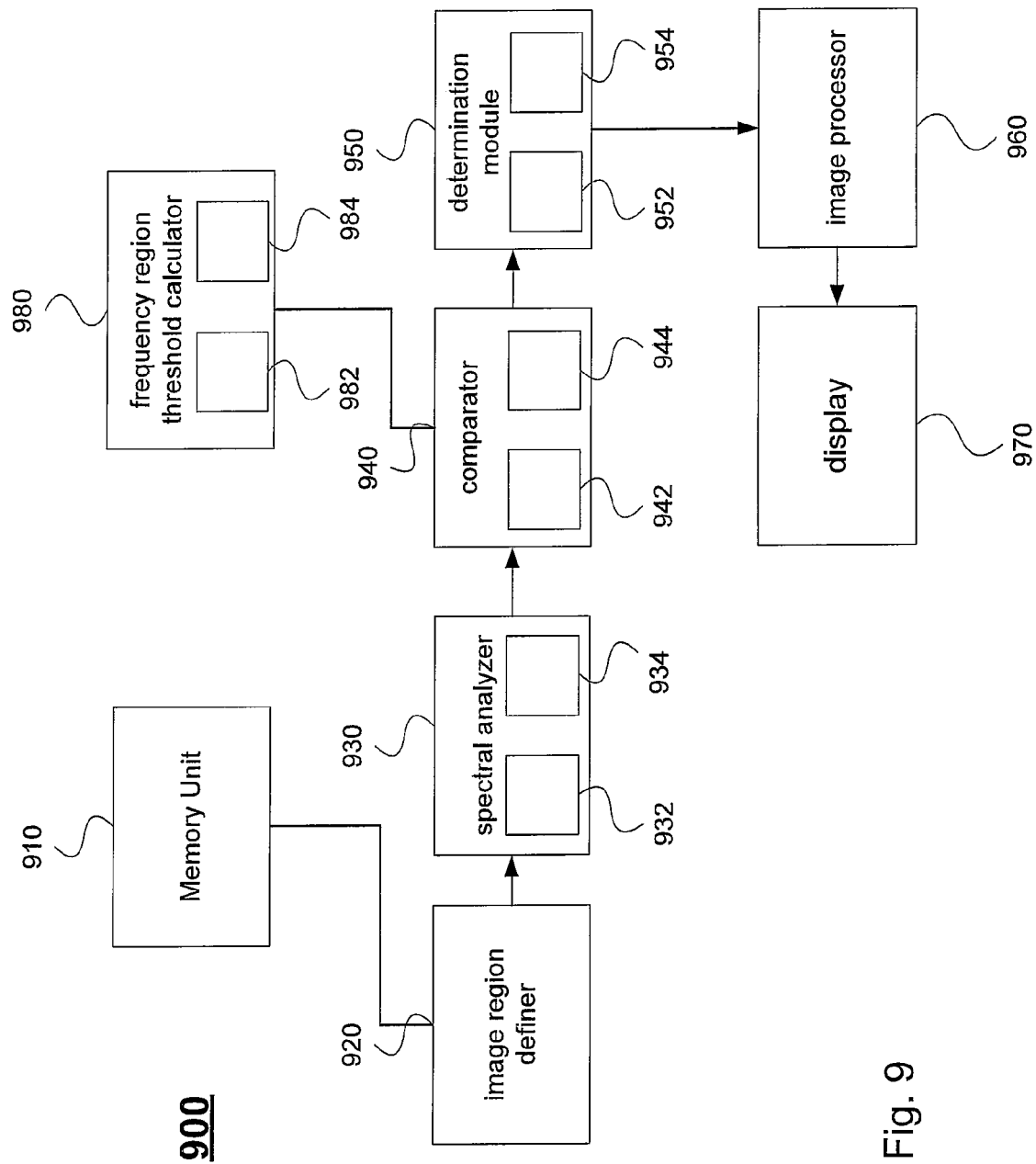
FIG. 9 illustrates an example of an embodiment of a system that is arranged to filter an image.

FIG. 9 illustrates an example of an embodiment of system 900 that is arranged to filter an image.

System 900 can be an integrated circuit, include one or more integrated circuits, can be a media player, a personal data accessory, a mobile phone, a smart-phone, a computer, a game console, a display controller, a display, a flat panel, and the like.

System 900 includes: (a) memory unit 910 that is arranged to receive image data representing an image, the image comprising a plurality of pixels; (b) image region definer 920 that is arranged to define, for each image pixel out of multiple image pixels, an image region; (c) spectral analyzer 930 that is arranged to: (i) divide a frequency spectrum of each image region into at least three image region frequency range components; and calculate an energy level for each of the image region frequency range component; (d) comparator 940 that is configured to compare the energy level of each image region frequency range component to at least one frequency region threshold to provide a comparison result for each image region frequency range component; wherein each frequency region threshold is calculated based on an intensity parameter of an image section and based on an energy parameter of at least one reference image section; (e) determination module 950 that is arranged to determine, a suitable processing operation for each image region frequency range component, based on a comparison result associated with the image region frequency range component and based on a configurable decision rule, wherein the processing operation is selected from a filtering operation and a bypass operation; (f) image processor 960 arranged to process each image region frequency range component according to the determination to provide processed image data; and send a display instructions, based on the processed image data, that cause the display to display the processed image data; (g) frequency region threshold calculator 980 that is arranged to calculate at least one frequency region threshold for each image region frequency component; and (h) display 970.

Display 970 is fed with output image data that cause display 900 to display an output image.

System 900 can execute method 100 and additionally or alternatively can execute method 200.

Frequency region threshold calculator 980 can, for example, determine vertical frequency region thresholds based upon image region horizontal frequency range components or based on horizontal frequency region thresholds.

Figure 10:
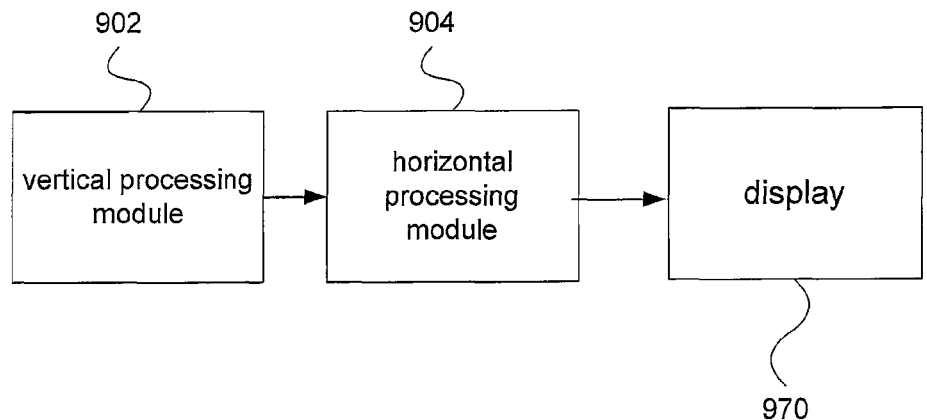
FIG. 10 illustrates an example of an embodiment of a system 900.

FIG. 10 illustrates an example of an embodiment of system 900 as including a vertical processing module 902 and a horizontal processing module 904. One module can follow the other but they can operate in parallel. Each of vertical processing module 932 and a horizontal processing module 934 can include its own image region definer, spectral analyzer, comparator, determination module and image processor. System 900 can also include one or more frequency region threshold calculator such as frequency region threshold calculator 980. The frequency region threshold calculator can be connected to vertical processing module 902, can be connected to horizontal processing module 904, can be included in vertical processing module 902, or can be connected to horizontal processing module 904.

Referring back to FIG. 9, spectral analyzer 930 can include vertical spectral analyzer 932 and horizontal spectral analyzer 934. Determination module 950 can include vertical determination module 952 and horizontal determination module 954. Comparator 940 can include a vertical comparator 942 and a horizontal comparator 944.

Frequency region threshold calculator 980 can include vertical frequency region threshold calculator 982 and horizontal frequency region threshold calculator 984.

Frequency region threshold calculator 980 can be arranged to calculate the intensity parameter of the image section as the average gray level of pixels of the image section; and calculate the energy parameter of at least one reference image section as an average value of reference image section first derivative values.

Spectral analyzer 930 can be arranged to calculate, in parallel, energy levels for different image region frequency range components; and comparator 940 is arranged to compare, in parallel, energy levels of different image region frequency components to different frequency region thresholds to provide comparison results.

It will be understood that the examples herein described and illustrated in the accompanying drawings may provide an improved method and apparatus for filtering image data including applying deflicker filtering, deranging, noise reduction, sharpening to image data, for an image to be displayed using an interlaced scan line technique or a progressive technique. Filtering can be applied locally to only those regions that may be prone to noise, flickering or other unwanted phenomena. Furthermore, examples hereinbefore described may enable unnecessary filtering of regions within the image, which are not prone to unwanted phenomena, to be substantially bypassed.

The invention may be implemented in a computer program for running on a computer system, at least including code portions for performing steps of a method according to the invention when run on a programmable apparatus, such as a computer system or enabling a programmable apparatus to perform functions of a device or system according to the invention. The computer program may be provided on a computer readable data carrier or media stored with data loadable in a memory of a computer system, the data representing the computer program. Such computer readable media may be permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Those skilled in the art will recognize that boundaries between the functionality of the above described operations merely illustrative. The functionality of multiple operations may be combined into a single operation, and/or the functionality of a single operation may be distributed in additional operations. Moreover, alternative examples may include multiple instances of a particular operation, and the order of operations may be altered in various other examples. It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

In one example, system 900 may comprise a computer system such as a personal computer system. Other examples may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A computer implemented method for filtering image data, the method comprising:
   receiving image data at the computer, wherein the image comprises a plurality of pixels;
   defining, for each image pixel out of multiple image pixels of the plurality of pixels, an image region;
   dividing a frequency spectrum of each image region into at least three image region frequency range components;
   calculating an energy level for each of the image region frequency range components;
   comparing the energy level of each image region frequency range component to at least one frequency region threshold to provide a comparison result for each image region frequency range component, wherein each frequency region threshold is calculated based on an intensity parameter of an image section and based on an energy parameter of at least one reference image section;
   determining, a processing operation for each image region frequency range component, based on the comparison result associated with the image region frequency range component and based on a configurable decision rule, wherein the processing operation is selected from a filtering operation and a bypass operation;
   processing each image region frequency range component according to said determining to provide processed image data; and
   displaying a processed image based on the processed image data.

2. The method according to claim 1 comprising:
   performing vertical processing of image data to provide vertical processed image data; and
   performing horizontal processing of the vertical processed image data to provide horizontal processed image data;
   wherein the performing of vertical processing comprises:
      dividing a vertical frequency spectrum of each image region into at least three image region vertical frequency range components;
      calculating an energy level for each of the vertical image region frequency range component;
      comparing the energy level of each vertical image region frequency range component to at least one vertical frequency region threshold to provide a comparison result for each image region vertical frequency range component;
      determining, a processing operation for each image region vertical frequency range component; and
      processing each image region vertical frequency range component according to the determination.

3. The method according to claim 1 comprising calculating a frequency region threshold associated with an image region, wherein the image section is the image region and the at least one reference image section comprises image regions of previous images that are located at a same location as the image region.

4. The method according to claim 1 comprising calculating a frequency region threshold associated with a image region, wherein the image section is an entire image and the at least one reference image section comprises the image region and image regions of previous images that are located at a same location as the image region.

5. The method according to claim 1 comprising calculating a frequency region threshold associated with a image region, wherein the image comprises a video portion and a graphic portion and the image section is defined so as not to include the graphic portion.

6. The method according to claim 1 comprising dividing a frequency spectrum of each image region into at least five image region frequency range components.

7. The method according to claim 1 comprising dividing a vertical frequency spectrum of each image region into at least five image region vertical frequency range components.

8. The method according to claim 1 wherein the image data represents a Luma component of the image.

9. The method according to claim 1 comprising:
calculating the intensity parameter of the image section as an average gray level of pixels of the image section; and
calculating the energy parameter of at least one reference image section as an average value of reference image section first derivative values.

10. The method according to claim 1 comprising:
calculating, in parallel, energy levels for different image region frequency range components; and
comparing, in parallel, energy levels of different image region frequency components to different frequency region thresholds to provide comparison results.

11. The method according to claim 1 comprising:
defining, for an image region frequency range component multiple frequency region threshold sets; and
selecting a set of frequency region thresholds based on an intensity parameter of an image section associated with the image region.

12. The method according to claim 1 comprising:
calculating, for an image region frequency range component multiple frequency region thresholds that are proportional to an energy parameter of at least one reference image section associated with the image region.

13. The method according to claim 1, wherein
the determining comprises determining whether to apply deflicker filtering to an image region high frequency range component; and
the processing comprises performing deflicker filtering to the image region high frequency range component.

14. A system arranged to filter an image, the system comprising:
a memory unit arranged to receive image data wherein the image comprises a plurality of pixels;
a image region definer arranged to define, for each image pixel out of multiple image pixels, an image region;
a spectral analyzer arranged to
divide a frequency spectrum of each image region into at least three image region frequency range components, and
calculate an energy level for each of the image region frequency range component;
a comparator configured to compare the energy level of each image region frequency range component to at least one frequency region threshold to provide a comparison result for each image region frequency range component, wherein each frequency region threshold is calculated based on an intensity parameter of an image section and based on an energy parameter of at least one reference image section;
a determination module arranged to determine a processing operation for each image region frequency range component, said determining based on a comparison result associated with the image region frequency range component and based on a configurable decision rule, wherein the processing operation is selected from a filtering operation and a bypass operation; and
an image processor arranged to process each image region frequency range component according to the determination to provide processed image data and send display instructions, based on the processed image data, that cause the display to display the processed image data.

15. The system according to claim 14 wherein the spectral analyzer comprises:
a vertical spectral analyzer and a horizontal spectral analyzer;
wherein the determination module comprises a vertical determination module and a horizontal determination module; and
wherein the comparator comprises a vertical comparator and a horizontal comparator.

16. The system according to claim 14 further comprising:
a frequency region threshold calculator arranged to calculate at least one frequency region threshold for each image region frequency component, wherein
the image section is the image region, and
the at least one reference image section comprises image regions of previous images that are located at a same location as the image region.

17. The system according to claim 14 further comprising:
a frequency region threshold calculator arranged to calculate at least one frequency region threshold for each image region frequency component, wherein
the image section is an entire image, and
the at least one reference image section comprises the image region and image regions of previous images that are located at a same location as the image region.

18. The system according to claim 14 further comprising:
a frequency region threshold calculator arranged to
calculate the intensity parameter of the image section as an average gray level of pixels of the image section, and
calculate the energy parameter of at least one reference image section as an average value of reference image section first derivative values.

19. The system according to claim 14, wherein
the spectral analyzer is arranged to calculate, in parallel, energy levels for different image region frequency range components, and
the comparator is arranged to compare, in parallel, energy levels of different image region frequency components to different frequency region thresholds to provide comparison results.

20. The system according to claim 14 further comprising:
a frequency region threshold calculator arranged to
define, for an image region frequency range component multiple frequency region threshold sets, and
select a set of frequency region thresholds based on an intensity parameter of an image section associated with the image region.

* * * * *